United States Patent
Ando (10) Patent No.: US 7,552,001 B2
(45) Date of Patent: Jun. 23, 2009

(54) IRRADIATION DIRECTION CONTROLLER AND LEVELING ANGLE SETTING METHOD OF VEHICLE LAMP

(75) Inventor: Masataka Ando, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 486 days.

(21) Appl. No.: 11/209,475

(22) Filed: Aug. 22, 2005

(65) Prior Publication Data

US 2006/0291222 A1    Dec. 28, 2006

(30) Foreign Application Priority Data

Aug. 23, 2004    (JP)    ............ P.2004-241911

(51) Int. Cl.
*B60Q 1/10*    (2006.01)
(52) U.S. Cl. .................... 701/49; 362/459
(58) Field of Classification Search .......... 701/1, 701/36–38, 49; 362/459, 460, 464–468, 362/276, 802
See application file for complete search history.

(56) References Cited

U.S. PATENT DOCUMENTS

| | | | | |
|---|---|---|---|---|
| 4,733,334 A | * | 3/1988 | Krey .................. | 362/463 |
| 5,877,680 A | * | 3/1999 | Okuchi et al. ........ | 340/468 |
| 5,896,011 A | * | 4/1999 | Zillgitt .............. | 315/82 |
| 5,907,196 A | * | 5/1999 | Hayami et al. ....... | 307/10.8 |
| 6,193,398 B1 | * | 2/2001 | Okuchi et al. ........ | 362/466 |
| 6,234,654 B1 | * | 5/2001 | Okuchi et al. ........ | 362/466 |
| 6,278,912 B1 | * | 8/2001 | Amano ............... | 701/1 |

FOREIGN PATENT DOCUMENTS

| | | |
|---|---|---|
| JP | 2000-16164 | 1/2000 |
| JP | 11-192886 | 7/2000 |
| JP | 2001-130315 | 5/2001 |
| JP | 2003-40029 | 2/2003 |

* cited by examiner

*Primary Examiner*—Dalena Tran
(74) *Attorney, Agent, or Firm*—Fish & Richardson P.C.

(57) ABSTRACT

A leveling controller (ECU) calculates a pitch angle based on a vehicle height value of a vehicle and controls an irradiation direction of a vehicle lamp. The leveling controller includes a vehicle height value initialization unit for initializing the detected vehicle height value, a determination unit for determining whether initialization by the vehicle height value initialization unit has been made, and a leveling angle setting unit for setting the leveling angle of the vehicle lamp based on the initialized vehicle height value or setting the leveling angle to a predetermined leveling angle, in accordance with the result of determination by the determination unit. An aiming device is arranged to perform aiming adjustment on the vehicle lamp in which the leveling angle is set by the leveling angle setting unit.

7 Claims, 6 Drawing Sheets

IRRADIATION DIRECTION CONTROLLER AND LEVELING ANGLE SETTING METHOD OF VEHICLE LAMP

The present application claims foreign priority based on Japanese Patent Application No. P.2004-241911, filed on Aug. 23, the contents of which are incorporated herein by reference.

BACKGROUND OF THE INVENTION

1. Field of the Invention

The present invention relates to a controller for controlling an irradiation direction of a vehicle lamp, and in particular to an irradiation direction controller and a leveling angle setting method, for vertically controlling the irradiation direction of a headlamp in accordance with the tilt angle of the front section of the vehicle in a vertical direction with respect to a road surface.

2. Related Art

When a cargo loading state of a vehicle or number of passengers are changed, a deflection quantity of a spring of a suspension device supporting a vehicle body may change, and an elevation angle formed by a front of the vehicle body with respect to a road surface, that is, a vertical angle of the vehicle in a longitudinal direction with respect to the road surface (hereinafter referred to as a pitch angle) may change. An irradiation angle (optical axis) of a headlamp mounted on a front of the vehicle also may change in the vertical direction following the pitch angle. When the irradiation direction is set upward, another vehicle such as an oncoming vehicle is dazzled. When the irradiation direction is set downward, front irradiation of the vehicle is insufficient. Neither case is preferable in terms of traffic safety. In order to keep constant the irradiation direction of the headlamp irrespective of the change in the pitch angle, there is an auto-leveling device. The auto-leveling device is provided with pitch angle detecting means for detecting the pitch angle of a vehicle, control means for outputting a control signal for adjusting the irradiation direction of the headlamp in vertical direction in accordance with the detected pitch angle, and an actuator for adjusting the angle of the headlamp with respect to the vehicle body based on the control signal.

The auto-leveling device is provided with, as means for detecting the pitch angle of the vehicle body, a vehicle height sensor for detecting the height of the vehicle with respect to the load surface. As a vehicle height sensor, for example, a measuring sensor for measuring the clearance in vertical direction between an axle and the vehicle body is used. A front wheel section and a rear wheel section each is equipped with a vehicle height sensor in order to calculate a pitch angle based on the vehicle height detected at each wheel section. In another option, a vehicle height sensor is provided on one of the front wheel section and rear wheel section in order to calculate a pitch angle based on the detected vehicle height.

During a mounting of the vehicle height sensor on the vehicle body, some mounting error may be occurred. Therefore, in general, an initialization is carried out so as to reset the mounting error to zero. This process is called as a vehicle height value initialization. As a vehicle height value initialization technique is proposed, for example, in JP-A-2003-40029. In the vehicle height value initialization technique of JP-A-2003-040029, a difference between an actual vehicle height and a design vehicle height is recorded as a correction value. The actual vehicle height is a value actually measured by the vehicle height sensor in a reference state where the vehicle body is horizontally even. The design vehicle height is a value calculated from a design of the vehicle. The vehicle height is corrected using the correction value in order to obtain a vehicle height that does not include the mounting error.

Figure 5:
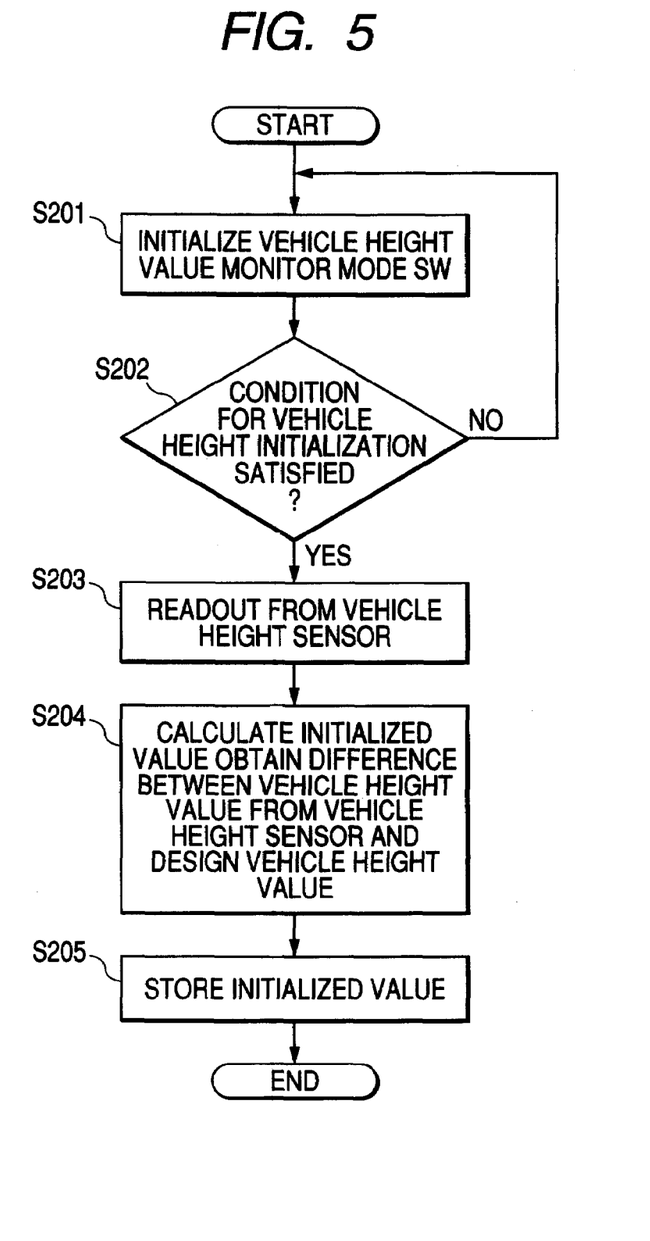
FIG. 5 is a flowchart showing the vehicle height value initialization process.

FIG. 5 is a flowchart explaining an exemplary general operation of vehicle height value initialization. When a vehicle height value mode switch is turned on (S201), it is determined whether the vehicle height value initialization conditions are satisfied (S202). The vehicle height value initialization conditions include whether the number of passengers is a predetermined value, whether the gas tank is full, and whether the tire air pressure is a predetermined value. When these conditions are satisfied, it is determined that the vehicle is in the reference state and the control means reads the actual vehicle height by the vehicle height sensor (S203). The actual vehicle height value is compared with the preset design vehicle height value. For example, the difference between the two is obtained (S204). The difference is recorded as an initialized value onto recording means (S205). In the subsequent auto-leveling control, the control means corrects a vehicle height value sequentially read from the vehicle height sensor by using the initialized value each time the vehicle height value is read. The control means then replaces the read vehicle height value with the corrected vehicle height value to calculate a pitch angle and a leveling angle. This process allows appropriate auto-leveling control.

By the way, during manufacturing/assembling the vehicle, an inspection process for inspecting whether the auto-leveling device of the headlamp operates normally, and an aiming adjustment process for setting an initial irradiation direction of a headlamp is carried out. The aiming adjustment process adjusts the mechanism of a headlamp so that the irradiation of a headlamp may be oriented in a proper direction when the headlamp is under auto-leveling operation by a controller.

In this way, the aiming adjustment is carried out while the auto-leveling operation is finished by control means. The auto-leveling operation must be normally and correctly finished at the time of aiming adjustment. A mounting error in a vehicle height value obtained from a vehicle height sensor prevents precise auto-leveling. Thus, the vehicle height value initialization must be done before the auto-leveling operation, and then the aiming adjustment must be made.

Figure 6:
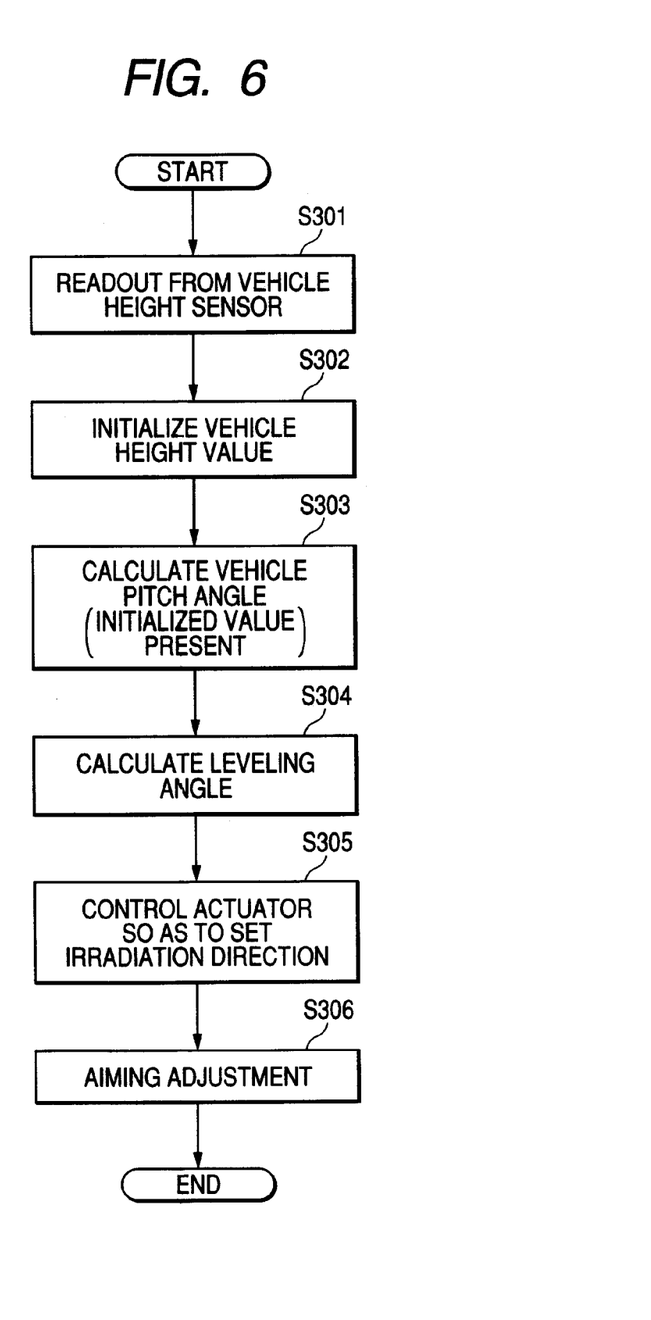
FIG. 6 is a flowchart showing the related art aiming adjustment process.

FIG. 6 is a flowchart explaining the main processes of related art aiming adjustment. First, a vehicle height value is read from a vehicle height sensor (S301). The vehicle height value initialization is performed on the read vehicle height value (S302), and a pitch angle is calculated based on the initialized value obtained by the initialization and a detected vehicle height value (S303). Next, a leveling angle is calculated so as to obtain a preset leveling angle (an angle in vertical direction formed by the irradiation direction of a headlamp with respect to the level direction when the pitch angle of the car body of a vehicle is "0") in correspondence with the calculated pitch angle (S304), and the actuator of an auto-leveling device is driven based on the calculated leveling angle (S305). After that, the aiming adjustment is carried out so as to set the irradiation direction of the headlamp to a predetermined direction (S306). Thus, assuming that the vehicle height value initialization in step S302 is skipped, the pitch angle calculated based on the read vehicle height contains an error. The leveling angle set in correspondence with the pitch angle also contains an error. The aiming adjustment of a headlamp set to an error-containing leveling angle results in inappropriate aiming adjustment.

In a vehicle assembly plant, when a layout of assembly lines are planed, it may be better that the aiming adjustment is carried out prior to the vehicle height value initialization, for an effective layout. However, in the above related-art, the vehicle height value initialization must be carried out prior to the aiming adjustment process. The related-art approach cannot respond to a request for such a flexible assembly process design.

SUMMARY OF THE INVENTION

In accordance with one or more embodiments of the present invention, an irradiation direction controller for a vehicle lamp is capable of performing an aiming adjustment prior to a vehicle height value initialization.

In accordance with one or more embodiments of the present invention, an irradiation direction controller for a vehicle lamp is provided with: a vehicle height sensor that detects a vehicle height value of at least apart of avehicle; a leveling controller that calculates a pitch angle of the vehicle based on the vehicle height value and controls an irradiation direction of the vehicle lamp in correspondence with the pitch angle, the leveling controller including: a vehicle height value initialization section that initializes the vehicle height value detected by the vehicle height sensor; an initialization determination section that determines whether the vehicle height value is initialized or not; anda leveling angle setting section that sets the leveling angle based on an initialized vehicle height value or sets the leveling angle to a predetermined leveling angle, in accordance with the result of determination by the initialization determination section; and an aiming device capable of adjusting the irradiation direction of the vehicle lamp independently from the leveling controller, and capable of performing an aiming adjustment on the vehicle lamp in which the leveling angle is set by the leveling angle setting section.

In accordance with one or more embodiments of the present invention, the vehicle height sensor may be arranged at least on one of a front wheel section and a rear wheel section.

In accordance with one or more embodiments of the present invention, the irradiation direction controller may be further provided with a first memory section that stores information indicating that the vehicle height value is initialized. The initialization determination section determines whether the vehicle height value is initialized or not, based on the information stored in the first memory section.

In accordance with one or more embodiments of the present invention, the irradiation direction controller may be further provided with: a second memory section that stores the initialized value obtained by the vehicle height value initialization section; and a third memory section that stores the predetermined leveling angle. In the irradiation direction controller, when the initialization determination section determines that the vehicle height value is initialized, the leveling angle setting section sets the leveling angle based on the vehicle height value obtained from the initialized value stored in the second memory section, and when the initialization determination section determines that the vehicle height value is not initialized, the leveling angle setting section sets the leveling angle based on the predetermined value stored in the third memory section.

In accordance with one or more embodiments of the present invention, a leveling angle setting method is provided with: detecting a vehicle height value; determining whether the vehicle height value is initialized or not; setting the leveling angle based on an initialized vehicle height value, when it is determined that the vehicle height value is initialized; setting the leveling angle based on a predetermined value, when it is determined that the vehicle height value is not initialized; and performing an aiming adjustment on the vehicle lamp in which the leveling angle is set.

In accordance with one or more embodiments of the present invention, when the vehicle height value obtained from a vehicle height sensor is initialized, precise aiming adjustment as before is possible. In case the vehicle height value is not initialized, leveling adjustment based on a predetermined value followed by aiming adjustment and subsequent initialization of the vehicle height value cancels an error in the aiming adjustment thus providing appropriate aiming adjustment. This assures flexibility in the assembly of a vehicle without using a fixed order of a vehicle height value initialization process and an aiming process.

Other aspects and advantages of the invention will be apparent from the following description and the appended claims.

DESCRIPTION OF THE PREFERRED EMBODIMENTS

Embodiments of the invention will be described with reference to the accompanying drawings.

Figure 1:
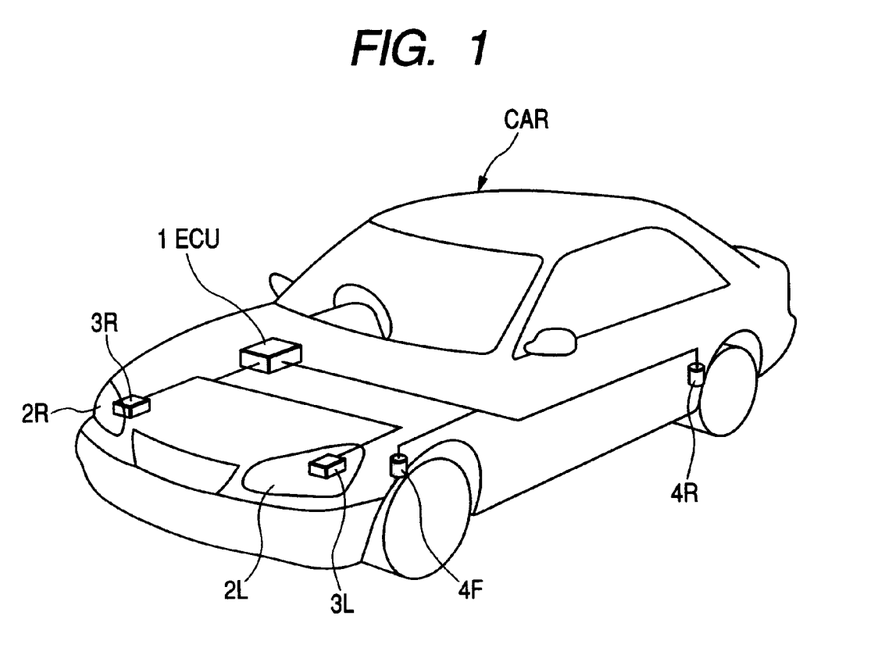
FIG. 1 is a conceptual diagram of a vehicle equipped with an irradiation direction controller.

FIG. 1 is a conceptual diagram of a vehicle equipped with an irradiation direction controller. The irradiation direction controller in FIG. 1 controls the irradiation direction of a pair of headlamps 2L, 2R provided on the front left and front right sections of a vehicle CAR. The irradiation optical axis of the headlamps 2L, 2R can be controlled in avertical direction or in up-down direction with respect to the vehicle body by way of left and right actuators 3L, 3R. As a controller for the actuators 3L, 3R for making angle control of the headlamps 2L, 2R, an Electronic Control Unit (ECU) 1 incorporating a CPU is provided. Based on a change in a pitch angle, the ECU 1 controls the irradiation direction of the headlamp to constantly form a certain angle in vertical direction with respect to a road surface. Further, vehicle height sensors 4F, 4R are provided for detecting the vehicle height of the vehicle at each of the front wheel section and rear wheel section of the vehicle with respect to the road surface. Detailed description of the vehicle height sensor is omitted. As mentioned above, a measuring sensor for measuring the clearance in vertical direction between an axle and the vehicle body is used. It is possible to provide a vehicle height sensor on either the front wheel section or rear wheel section and calculate a pitch angle from only the vehicle height detected by the vehicle height sensor.

Figure 2:
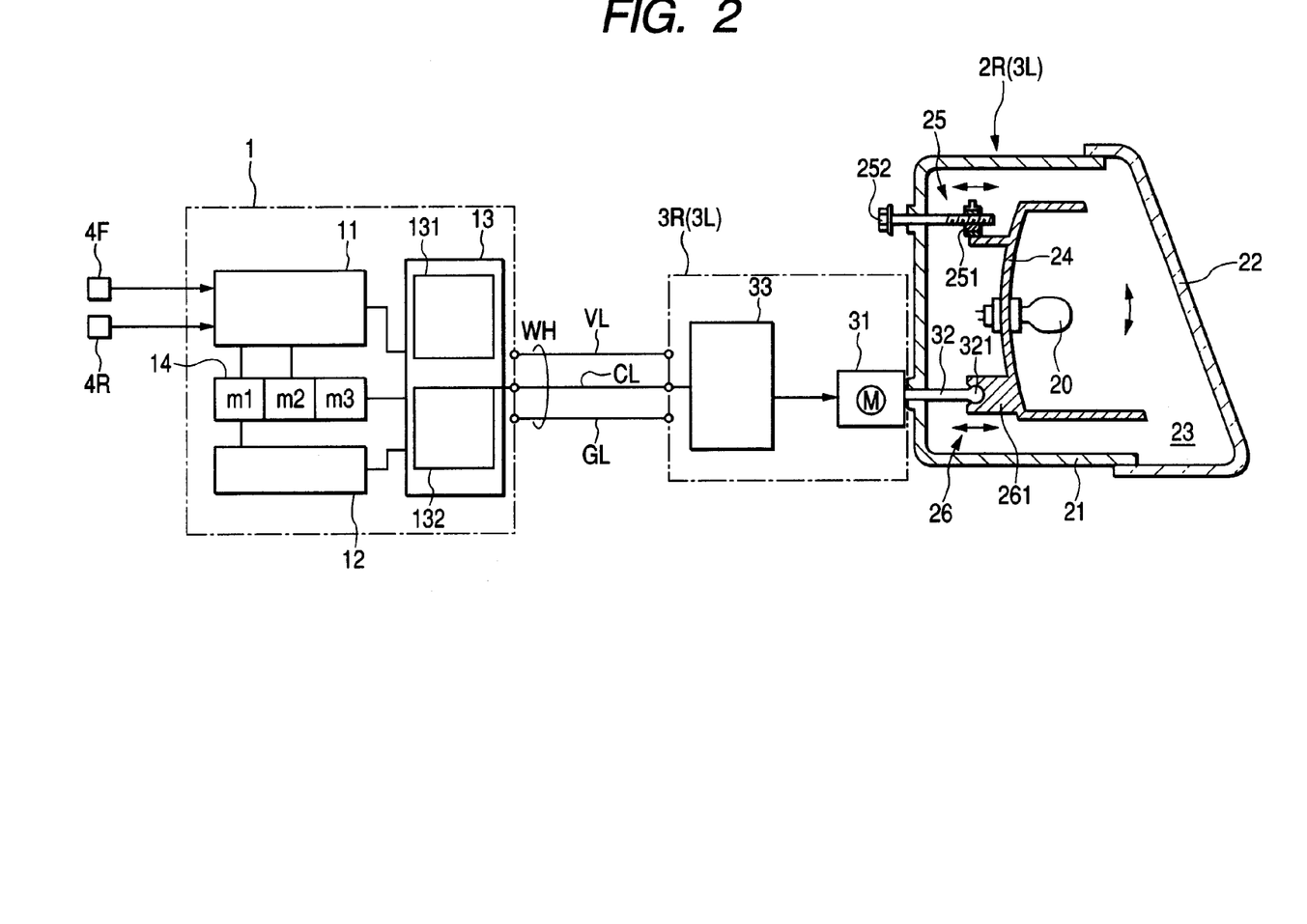
FIG. 2 is a block diagram of the irradiation direction controller.

Each of the left and right head lamps 2L, 2R has asymmetrical design. The right headlamp 2R is used for explanation referring to FIG. 2. In a lamp room 23 constituted by a lamp body 21 and a lens 22, a reflector 24 with a bulb 20 attached as a light source is supported tiltably in vertical direction by an aiming mechanism 25 and a leveling mechanism 26. The aiming mechanism 25 has an aiming nut 251 fixed while protruding rearward at top left and right sections of the rear surface of the reflector 24. An aiming screw 252 supported rotatably on a lamp body 21 is threaded to the aiming nut 251. In FIG. 2, only the front aiming nut and the front aiming screw are shown. The leveling mechanism 26 has the actuator 3R mounted on the lamp body and tilts the reflector 24 in vertical direction by way of the actuator 3R. That is, the actuator 3R is provided with an adjusting rod 32 that is moves linearly in the longitudinal direction of a lamp by using a motor 31 as a driving source. A ball 321 provided at the adjusting rod 32 is engaged in a ball bearing 261 provided on part of the rear surface of the reflector 24.

The headlamp 26R is designed so that, when the aiming screw 252 is manually rotated, the aiming nut 251 goes spirally to move the top left/right sections of the reflector in the longitudinal direction of the lamp to tilt the reflector 24 in vertical direction, thus allowing aiming adjustment. On the other hand, the headlamp 26R is designed so that the motor 31 of the actuator 3R is rotated to move the adjusting rod 32 in axial direction, that is, in the longitudinal direction of the lamp to tilt the reflector 24 in vertical direction, thus allowing leveling adjustment.

The actuator 3R is connected to the ECU 1 by way of a wire harness WH including a power line VL, a control signal line CL and a ground (GND) line GL. In particular, to the control signal line CL is output a control signal for a tilt angle for making leveling adjustment of the reflector 24 of the headlamp 2R by using the ECU 1. The actuator 3R incorporates a potentiometer (not shown) for detecting the tilt angle of the reflector 24. The actuator 3R includes a driving IC 33 for comparing the signal level of a feedback signal supplied from the potentiometer and that of a control signal input from the control signal line CL in order to perform current control of the motor 31.

In the actuator 3R, when the control signal is input from the ECU 1 via the control signal line CL, the driving IC 33 detects on the potentiometer, as a feedback signal, a voltage corresponding to the tilt angle of the reflector 24 of the headlamp 2R, and calculates an output that will produce zero level difference between the feedback signal and the control signal level and provides the output to the motor 31. Thus, the motor 31 is rotated to the rotating position where the level difference is zero. It is thus possible to linearly move the adjusting rod 32 to tilt the reflector 24, thereby adjusting the irradiation direction of the headlamp 2R at a leveling angle that follows the control signal.

The ECU 1 as a controller (a leveling controller) comprises a vehicle height value initialization section 11, an initialization determination section 12, a leveling angle setting section 12, and a memory device 14. The vehicle height value initialization section 11 initializes a vehicle height value received from the vehicle height sensor 4F, 4R. The vehicle height value initialization section 11 initializes a vehicle height value received from the vehicle height sensor 4F, 4R based on a specified vehicle height value (design vehicle height value) assumedwhen the vehicle CAR is set to the reference state. When initialization is performed, an initialization flag is set to a first memory section m1 provided in the memory device 14. As mentioned above, the reference state refers to a state where the vehicle is halted on a level base under the conditions that the number of passengers of the vehicle CAR is in a predetermined value, the gas tank is full, and the tire pressure is in a predetermined air pressure. The vehicle height value initialization section 11 compares the vehicle height value received from the vehicle height sensor 4F, 4R assumed when the vehicle CAR is in a reference state and the stored design vehicle height value, obtains the difference therebetween, and stores, as an initialized value, the difference into a second memory section m2 in the memory device 14. A mounting error of the vehicle height sensor 4F, 4F appears as a small or large dimensional difference with respect to the detection output of the vehicle height sensor, and thus readily obtained by calculating the difference.

The initialization determination section 12 determines the initialization flag stored in the first memory section m1 in the memory device 14 to determine whether initialization has taken place on the vehicle height value obtained from the vehicle height value 4F, 4R.

The leveling angle setting section 13 comprises a pitch angle calculating section 131 and a driving output section 132. The pitch angle calculating section 131 obtains a vehicle height value output from the vehicle height sensor 4F, 4R and a vehicle height value corrected based on the initialized value obtained through initialization in the vehicle height value initialization section 11, and calculates the pitch angle of the vehicle based on the vehicle height values. The pitch angle calculating section 131 stores, as a default value used when initialization of a vehicle height value is not made, a predetermined pitch angle value in a third memory section m3 in the memory device 14. The driving output section 132 calculates the leveling angle with respect to a car body assumed when the headlamp 2R, 2L is equal to the pitch angle, calculates a leveling signal used for setting to the leveling angle, and sends the resulting signal to the actuator 3R, 3L. The driving output section 132 uses, in this process, the pitch angle calculated by the pitch angle calculating section 131 or the pitch angle stored in the third memory section m3.

Figure 3:
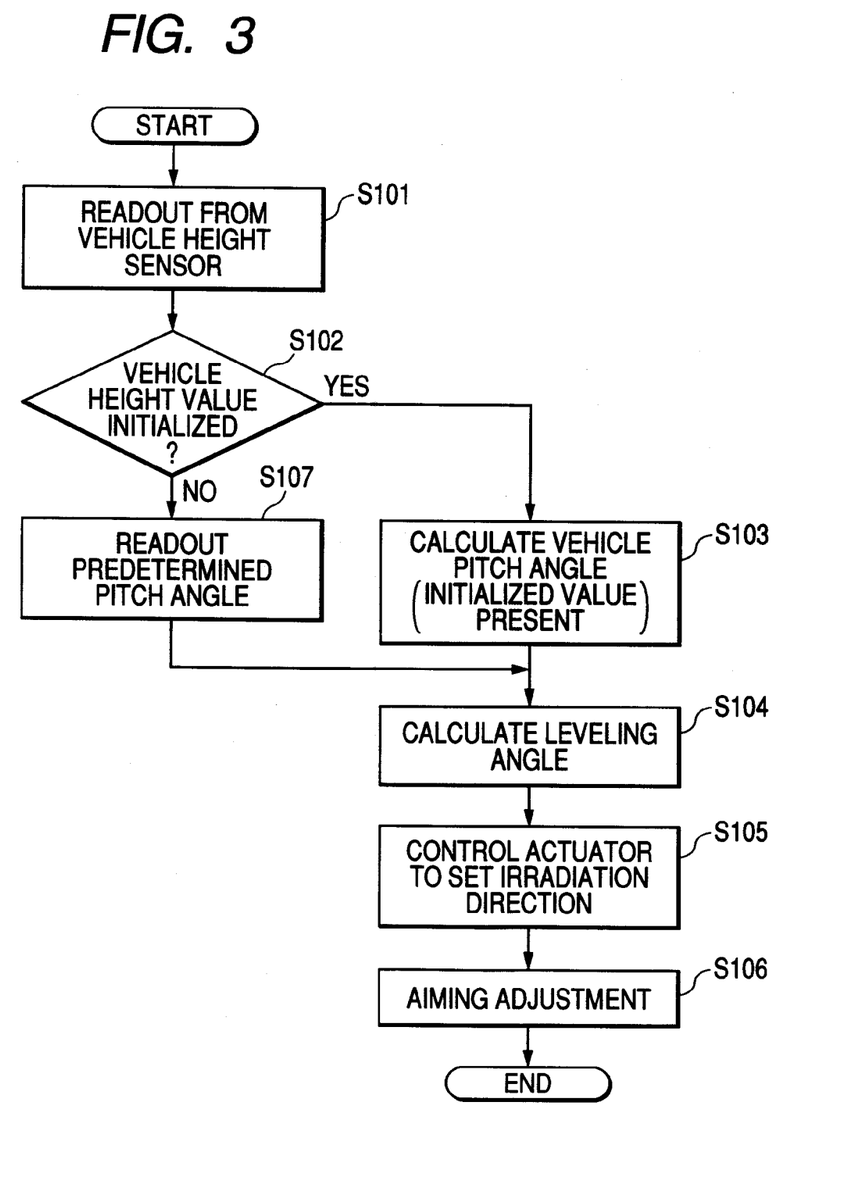
FIG. 3 is a flowchart showing the aiming adjustment process.

Aiming adjustment made by thus configured irradiation direction controller is described below referring to the flowchart of FIG. 3. When a vehicle is halted on a base used for aiming adjustment, aiming adjustment starts. The ECU 1 reads the vehicle height value corresponding to the vehicle height signal from the vehicle height sensor 4F, 4R (S101). The vehicle height value is input to the vehicle height value initialization section 11. Once the conditions necessary for initialization are satisfied, initialization of the vehicle height value is executed. In this initialization process, an initialized value is obtained based on a vehicle height value received from the vehicle height sensor 4F, 4R and a preset design vehicle height value. The initialized value is input to the second memory section m2. When the initialization is complete, an initialization flag is set to the first memory section m1.

Figure 4A:
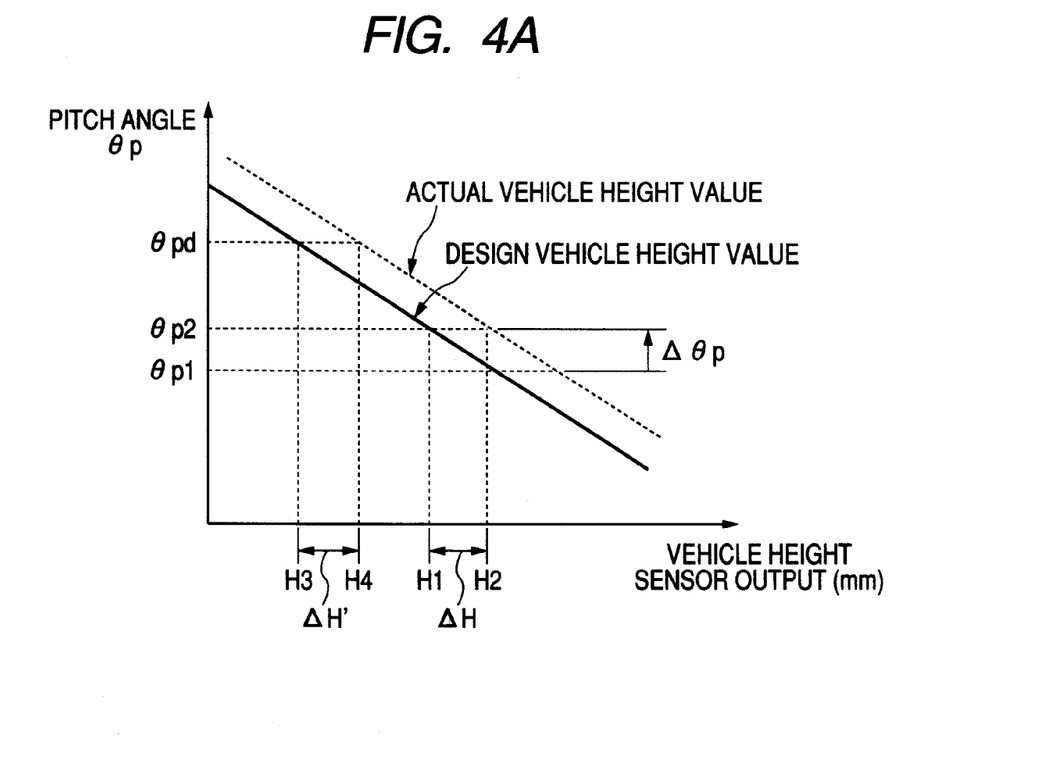
FIG. 4A shows a relationship between an output of a vehicle height sensor and a pitch angle.
Figure 4B:
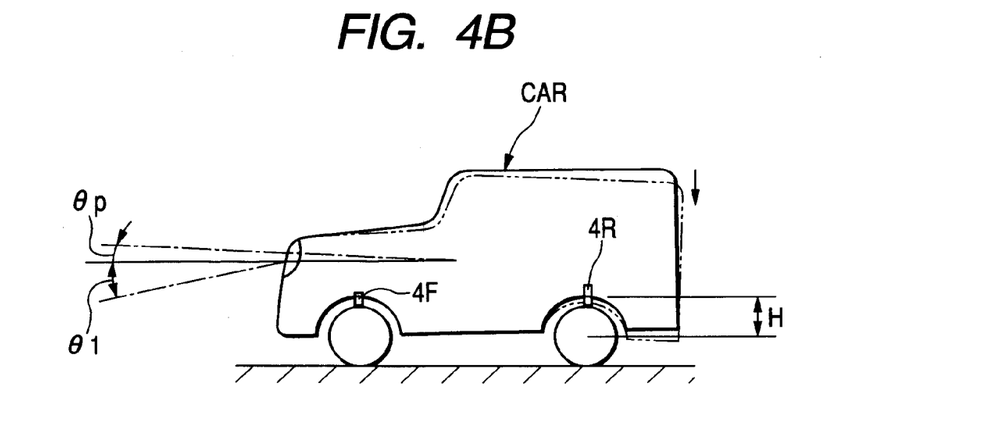
FIG. 4B shows the relationship between a vehicle height value detected by the vehicle height sensor on a rear wheel section and the pitch angle with respect to the horizontal direction.

The initialization determination section 12 determines the initialization flag in the first memory section m1 in order to determine whether initialization is complete (S102). In case the initialization determination section 12 has determined that initialization is complete, the pitch angle calculating section 131 corrects the vehicle height value read from the vehicle height sensor 4F, 4R by using the initialized value stored in the second memory section m2, and calculates a pitch angle based on the corrected vehicle height value (S103). Since the vehicle is in the reference state at aiming adjustment, the vehicle is level and the pitch angle is "0". FIG. 4A shows the relationship between the output of the vehicle height sensor and the pitch angle. The axis of abscissa expresses vehicle height values obtained from a vehicle height sensor and the axis of ordinate express pitch angles. To simplify the explanation, as in FIG. 4B, there is shown the relationship between a vehicle height value H detected by the vehicle height sensor 4R on a rear wheel section and the pitch angle θp with respect to the horizontal direction. In FIG. 4B, the pitch angle characteristic obtained when the vehicle height sensor 4R is mounted as specified by the design value is shown in solid lines while the pitch angle characteristic obtained when a required mounting error is included with respect to the design value is shown in broken lines. Thus, when the vehicle height obtained from the vehicle height sensor 4R is H1, a pitch angle θp1 should be obtained as a design value although a mounting error results in a pitch angle θp1, with an error of Δθp. Thus, by calculating a vehicle height value H2 to obtain the same pitch angle θp1 in the characteristic shown by the broken lines and using the difference ΔH between theses vehicle height values as an initialized value of vehicle height, it is possible to obtain a mounting-error-corrected pitch angle by way of calculation of a pitch angle based on a vehicle height value obtained through use of the initialized value ΔH in correcting a vehicle height value received from the vehicle height sensor 4R.

The driving output section 132 calculates the leveling angle θ1 as a tilt angle in vertical direction of an appropriate headlamp corresponding to the calculated pitch angle (S104), and outputs a corresponding voltage to the actuator 3R, 3L. The actuator 3R, 3L rotates the motor to a predetermined rotating position, and sets the reflector 24 at a required angle, that is, a predetermined leveling angle (S105). Then, the operator manually adjusts the aiming mechanism 25 to execute aiming adjustment (S106).

In case the initialization determination section 12 has determined that initialization is not made in step S102, an initialized value is not stored in the second memory section m2. The pitch angle calculating section 131 reads a default predetermined pitch angle stored in the third memory section m3 (S107). The predetermined pitch angle is a previously set arbitrary angle which is a constant pitch angle θpd irrespective of the vehicle height value received from a vehicle height sensor, for example when shown overlaid on FIG. 4A. The driving output section 132 calculates the leveling angle corresponding to the predetermined pitch angle θpd (S104) and outputs a corresponding voltage to the actuator 3R, 3L. The actuator 3R, 3L uses the voltage to rotate the motor 31 to a predetermined rotating position and sets the reflector 24 at a required angle, that is, a predetermined leveling angle (S105). The predetermined leveling angle is set irrespective of a vehicle height value read from the vehicle height sensor 4F, 4R. Then, the operator manually adjusts the aiming mechanism 25 to execute aiming adjustment (S106).

According to this aiming adjustment approach, when an actuator is controlled using a default pitch angle, a mounting error of the vehicle height sensor 4F, 4R is passed to the leveling angle adjustment, resulting in aiming adjustment following the vehicle height value containing the error, as understood from FIG. 4. Afterwards, as shown in FIG. 5, the vehicle height value is initialized in the vehicle height value initialization section 11 to obtain an initialized value. In the subsequent process, the correction value is used to initialize a vehicle height value and a pitch angle is calculated in the pitch angle calculating section 131. For example, in the case of FIG. 4A, a difference ΔH' between the design vehicle height value H3 and the error-containing vehicle height value H4 with respect to the predetermined pitch angle θpd is used as an initialized value to perform initialization thereby obtaining a mounting-error-corrected pitch angle. As a result, auto-leveling adjustment that is based on precise aiming adjustment is made, same as in the state where the mounting error of the vehicle height sensor 4F, 4R is corrected, that is, when the vehicle height value is initialized before aiming adjustment is executed as mentioned above. Therefore, concerning the design of an assembly line in a plant, it is possible to respond to a request that aiming adjustment be made before initialization of vehicle height value from layout-related reasons in a design process.

As in the foregoing embodiment, a configuration is possible where, instead of a predetermined pitch angle, a leveling angle corresponding to the predetermined pitch angle is stored in the third memory m3 and the actuator is driven using the leveling angle stored in the third memory m3 in case the vehicle height value is not initialized. In this case, it is possible to skip a step of calculating a leveling angle based on a predetermined pitch angle. This boosts the overall processing.

While a vehicle height sensor is provided on each of the front wheel section and the rear wheel section of a vehicle, the invention is applicable to an auto-leveling device designed to calculate the pitch angle of a vehicle based on a vehicle height value from a vehicle height sensor arranged on either the front or rear wheel section. In this case, as described in JP-A-2003-40029, the vehicle height value detected by the single vehicle height sensor is used to calculate a pitch angle based on the correlation between a predetermined vehicle height value and a pitch angle. Since only a single vehicle height sensor is used, the overall configuration is simplified, which provides cost-effectiveness.

In a vehicle equipped with an aiming mechanism using a motor as a driving source, the invention is applicable to aiming adjustment in the aiming mechanism.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An irradiation direction controller for a vehicle lamp comprising:
   a vehicle height sensor that detects a vehicle height value of at least a part of a vehicle;
   a leveling controller that calculates a pitch angle of the vehicle based on the vehicle height value and controls an irradiation direction of the vehicle lamp in correspondence with the pitch angle, the leveling controller including:
      a vehicle height value initialization section to obtain a difference between a vehicle height value detected by the vehicle height sensor and a design vehicle height, and to store the difference as an initialized vehicle height value;
      an initialization determination section that determines whether the vehicle height value is initialized or not; and
      a leveling angle setting section that sets the leveling angle based on an the initialized vehicle height value or sets the leveling angle to a predetermined leveling angle, in accordance with the result of determination by the initialization determination section; and
   an aiming device capable of adjusting the irradiation direction of the vehicle lamp independently from the leveling controller, and capable of performing an aiming adjustment on the vehicle lamp in which the leveling angle is set by the leveling angle setting section.

2. The irradiation direction controller according to claim 1, wherein the vehicle height sensor is arranged at least on one of a front wheel section and a rear wheel section.

3. The irradiation direction controller according to claim 1, further comprising:
 a first memory section that stores information indicating that the vehicle height value is initialized,
 wherein the initialization determination section determines whether the vehicle height value is initialized, based on the information stored in the first memory section.

4. The irradiation direction controller according to claim 1 further comprising:
 a leveling mechanism configured to change the leveling angle; and
 an aiming mechanism that is independent from the leveling mechanism and configured to perform the aiming adjustment,
 wherein the leveling mechanism comprises an actuator, and the aiming mechanism comprises an aiming nut and an aiming screw.

5. The irradiation direction controller according to claim 4 wherein the actuator of the leveling mechanism is arranged to be driven by a motor, and the aiming screw is arranged to be rotated by an operator.

6. An irradiation direction controller for a vehicle lamp comprising:
 a vehicle height sensor to detect a vehicle height value of at least a part of a vehicle;
 a leveling controller to calculate a pitch angle of the vehicle based on the vehicle height value and to control an irradiation direction of the vehicle lamp in correspondence with the pitch angle, the leveling controller including:
  a vehicle height value initialization section to initialize the vehicle height value detected by the vehicle height sensor;
  an initialization determination section to determine whether the vehicle height value is initialized or not; and
  a leveling angle setting section to set the leveling angle based on an initialized vehicle height value or to set the leveling angle to a predetermined leveling angle, in accordance with the result of determination by the initialization determination section; and
 an aiming device to adjust the irradiation direction of the vehicle lamp independently from the leveling controller, and to perform an aiming adjustment on the vehicle lamp in which the leveling angle is set by the leveling angle setting section,
 a first memory section that stores information indicating that the vehicle height value is initialized, wherein the initialization determination section is arranged to determine whether the vehicle height value is initialized, based on the information stored in the first memory section,
 a second memory section that stores the initialized value obtained by the vehicle height value initialization section; and
 a third memory section that stores the predetermined leveling angle,
 wherein the controller is arranged so that, when the initialization determination section determines that the vehicle height value is initialized, the leveling angle setting section sets the leveling angle based on the vehicle height value obtained from the initialized value stored in the second memory section, and so that, when the initialization determination section determines that the vehicle height value is not initialized, the leveling angle setting section sets the leveling angle based on the predetermined value stored in the third memory section.

7. A method of setting a leveling angle of a vehicle lamp, the method comprising:
 detecting a vehicle height value;
 determining whether the vehicle height value is initialized or not wherein initializing the vehicle height value includes obtaining a difference between the detected vehicle height value and a design vehicle height, and storing the difference as an initialized vehicle height value;
 setting the leveling angle based on the initialized vehicle height value, when it is determined that the vehicle height value is initialized;
 setting the leveling angle based on a predetermined value, when it is determined that the vehicle height value is not initialized; and
 performing an aiming adjustment on the vehicle lamp in which the leveling angle is set.

* * * * *